Jan. 15, 1952 L. S. WILLIAMS 2,582,517
LABORATORY BALANCE
Filed July 18, 1946 7 Sheets-Sheet 1
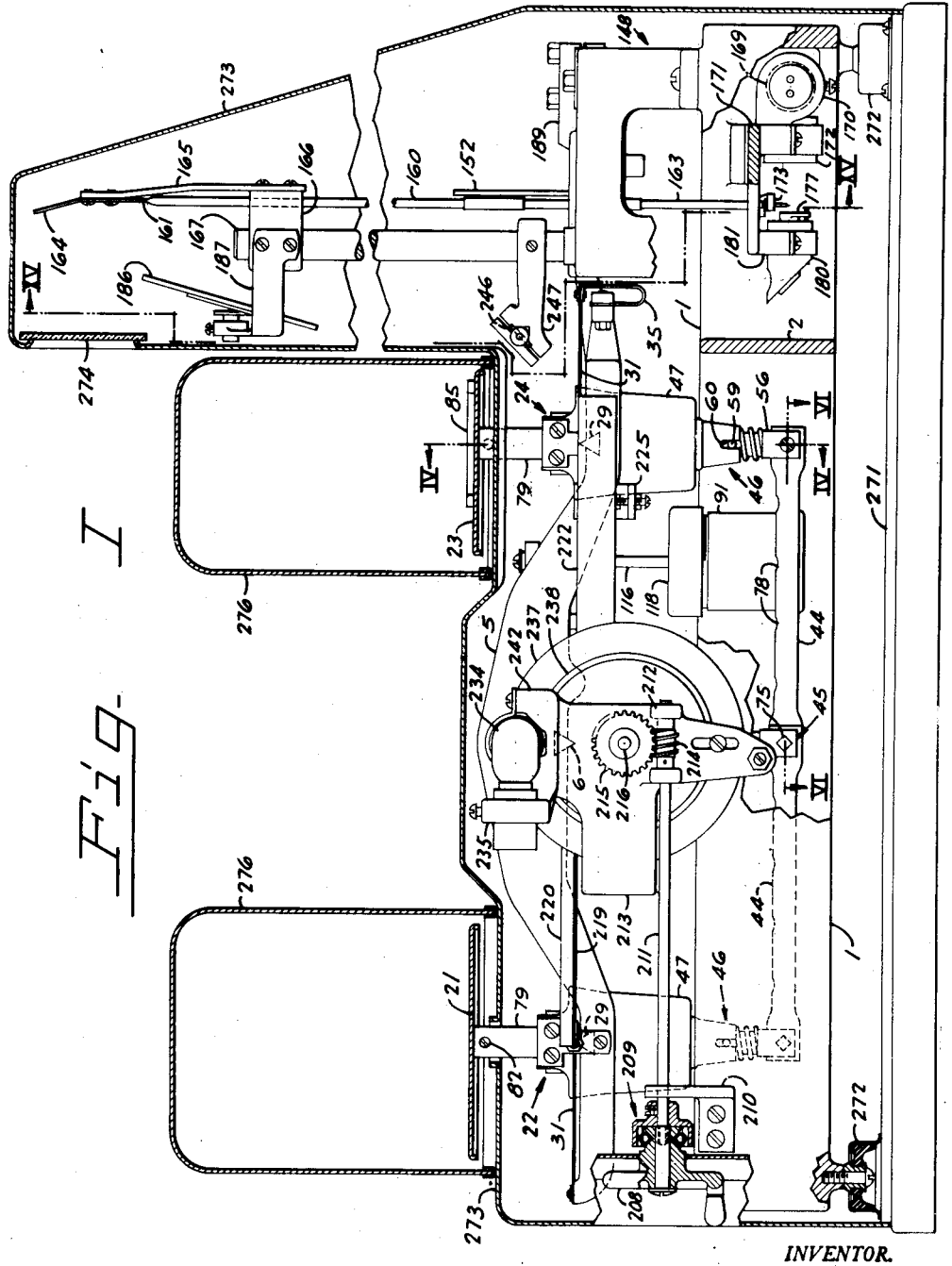
Fig. I
INVENTOR.
Lawrence S. Williams
BY
Marshall and Marshall
ATTORNEYS

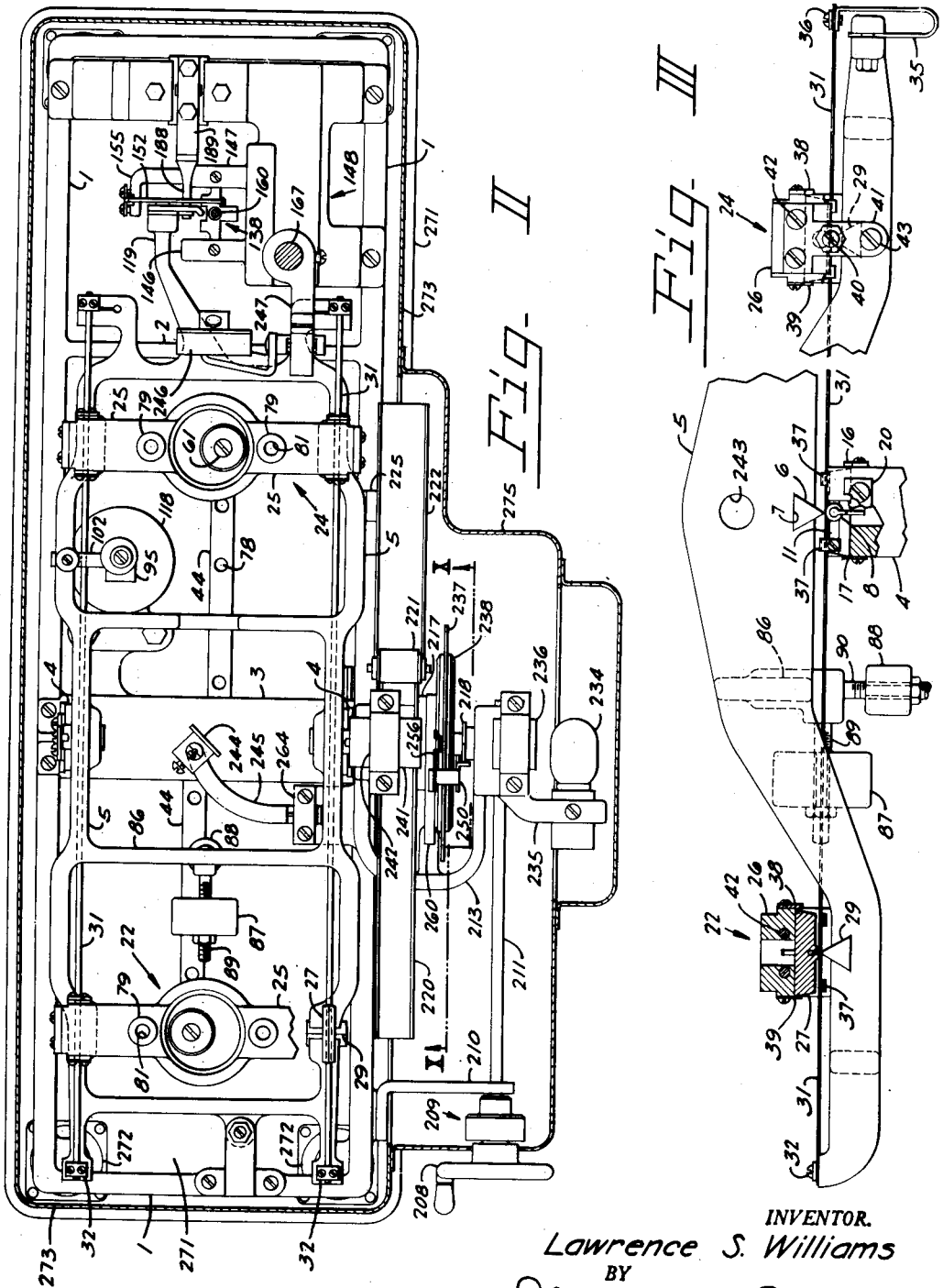

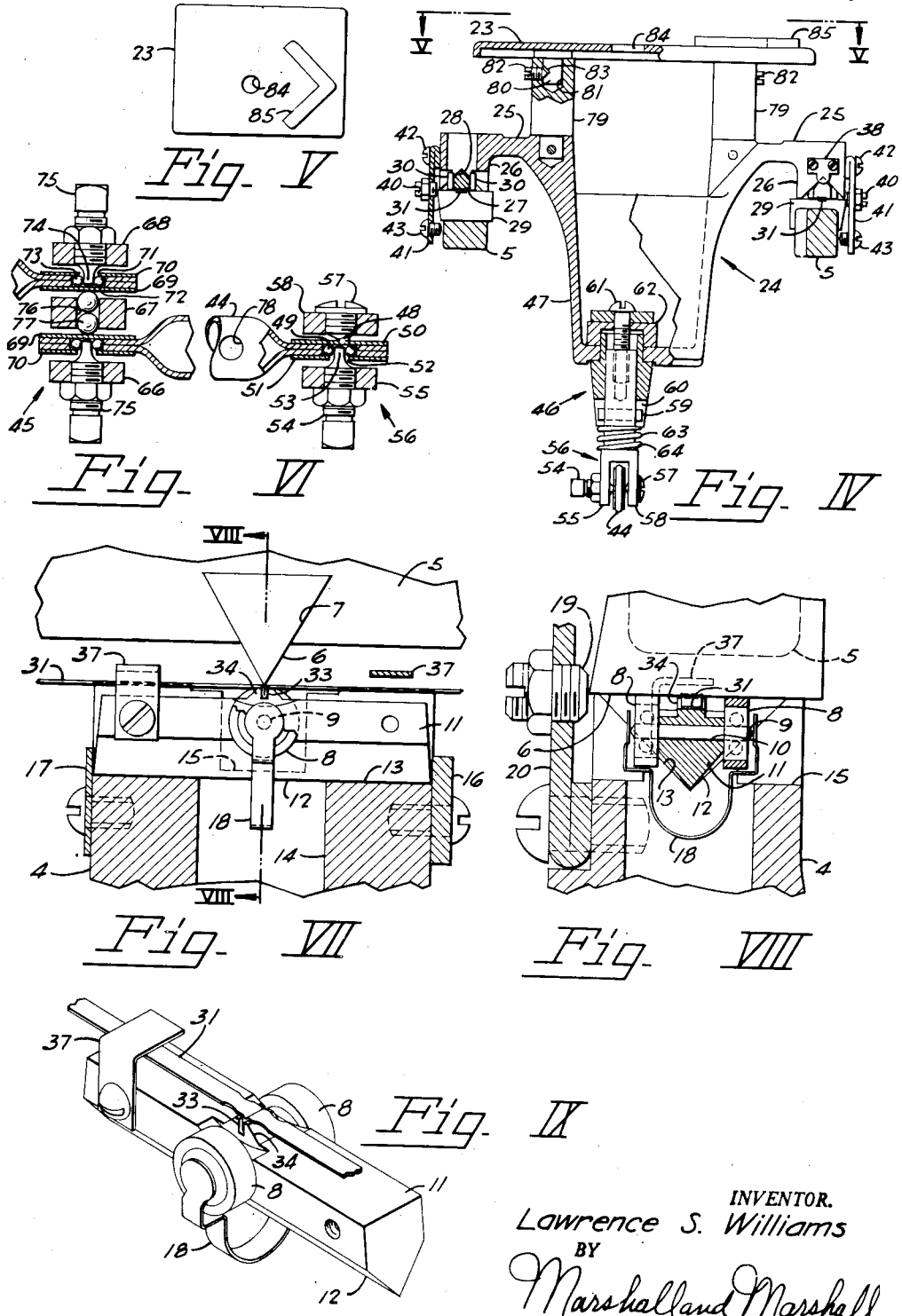

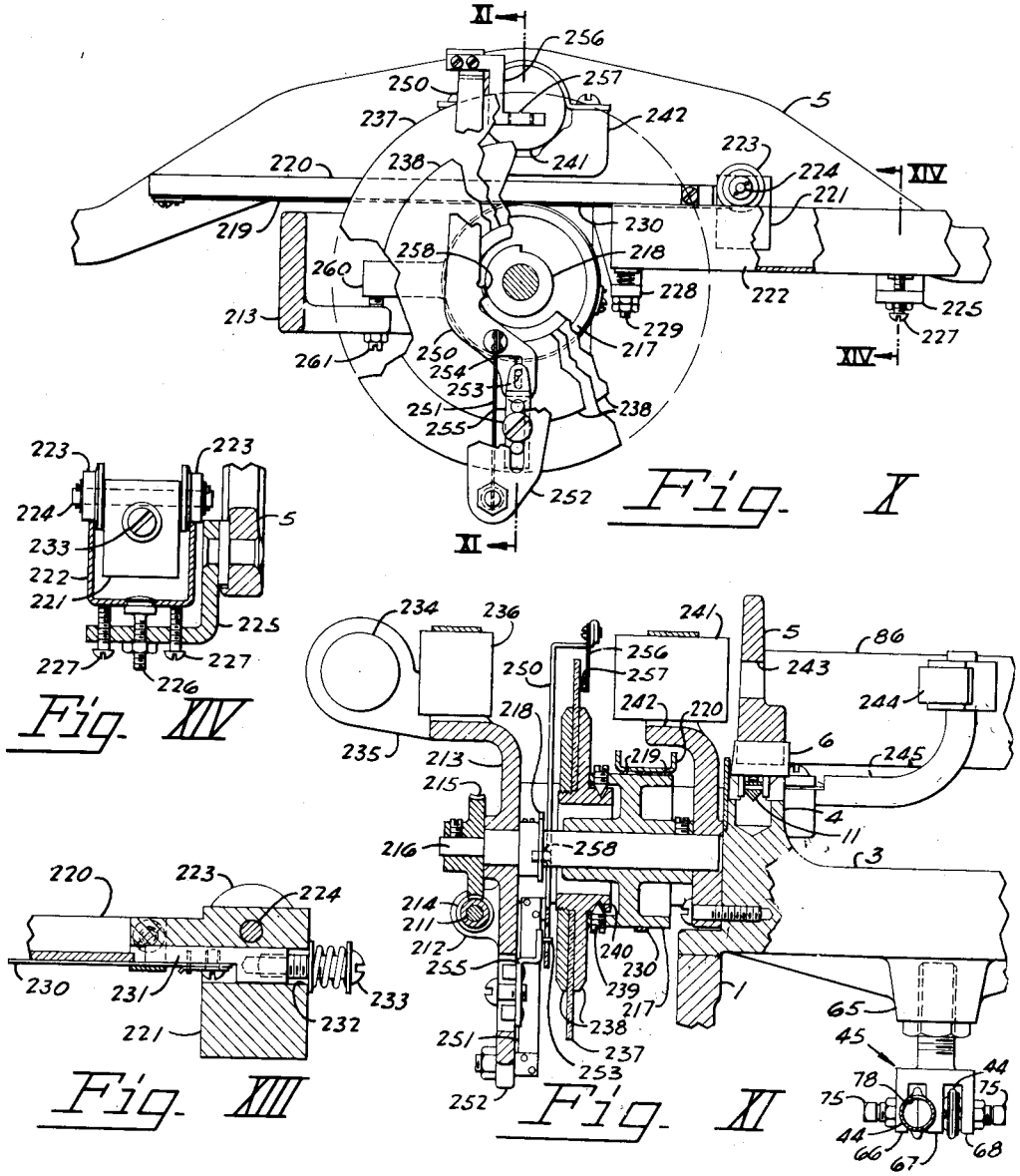

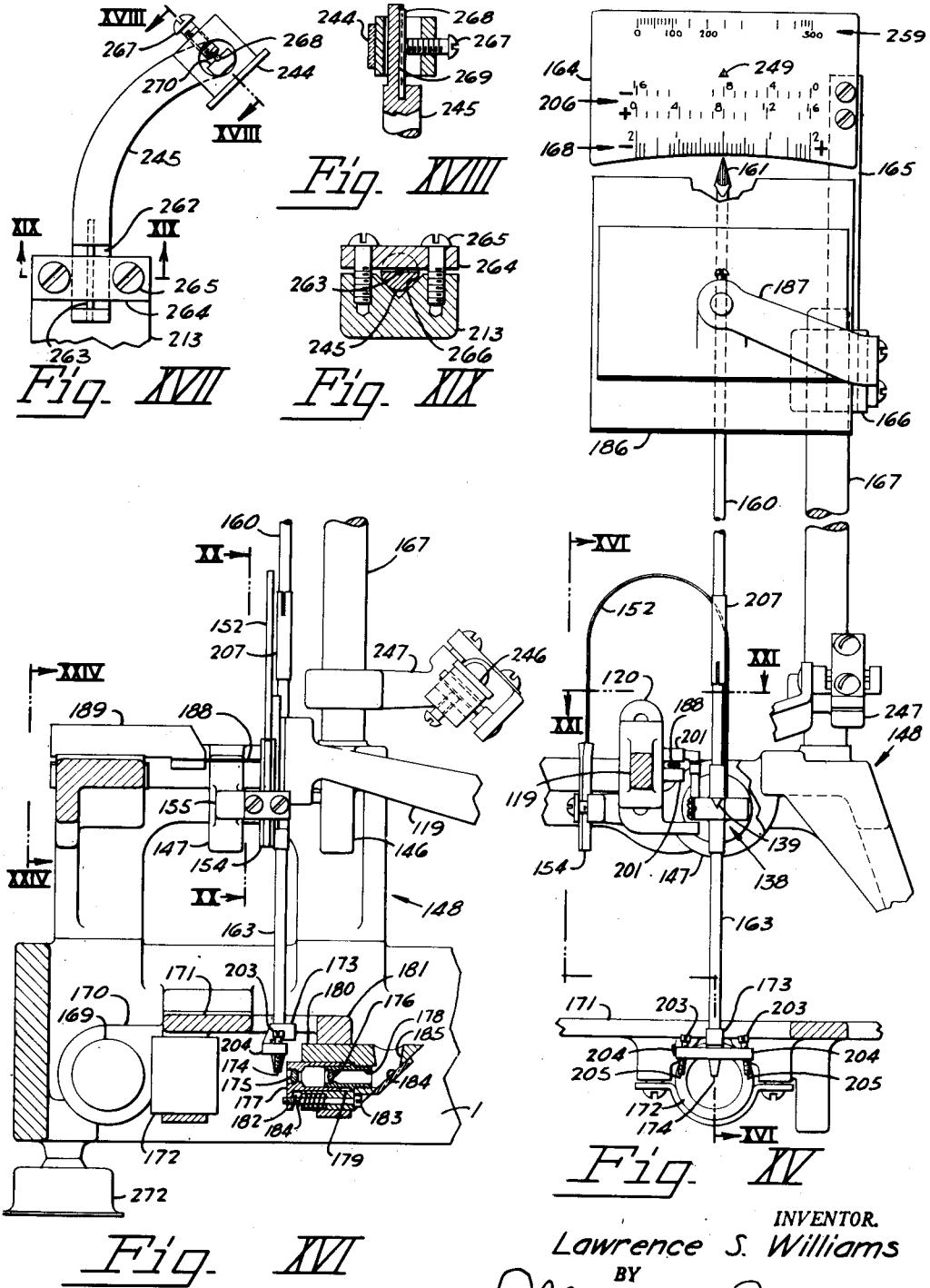

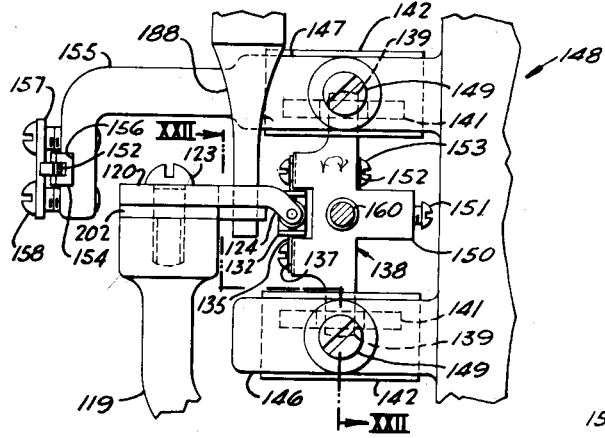
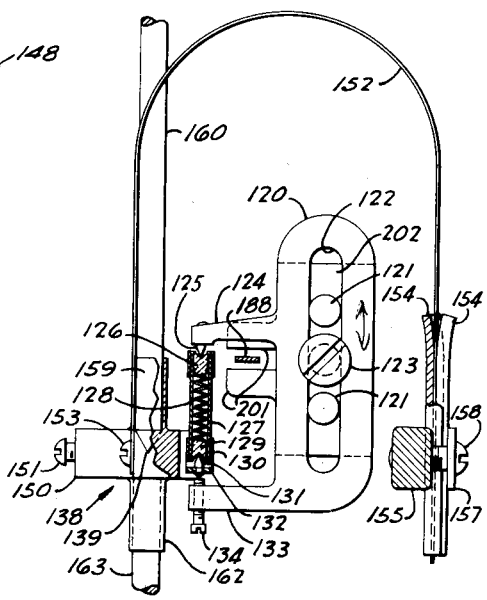
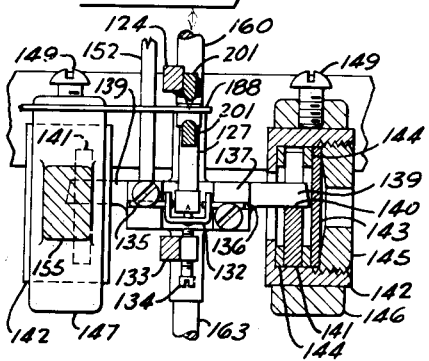
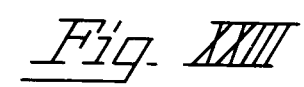
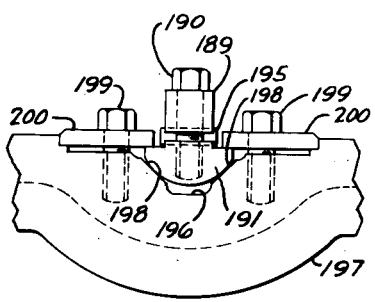
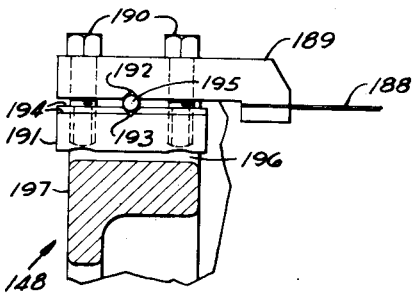
INVENTOR.
Lawrence S. Williams
BY
Marshall and Marshall
ATTORNEYS

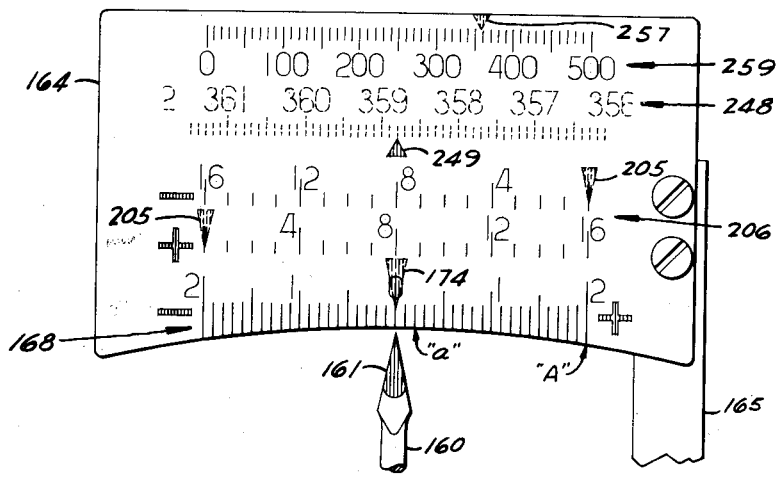
Fig. XXVI
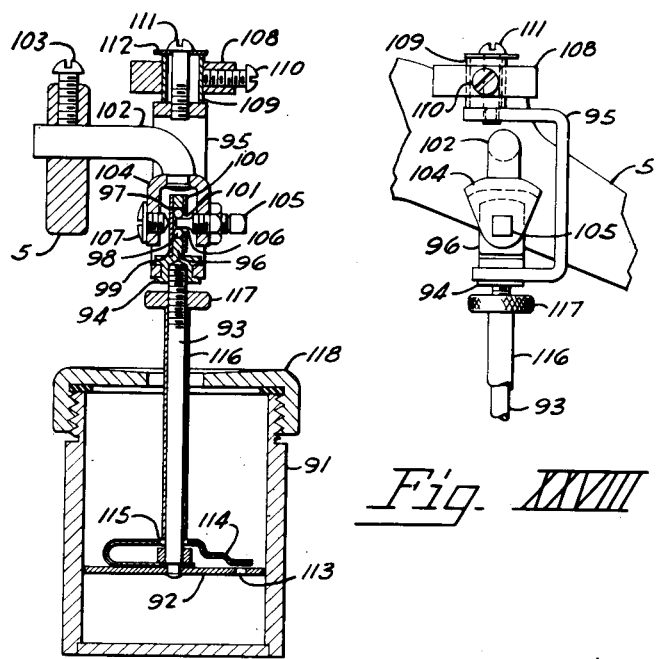
Fig. XXVII
Fig. XXVIII
INVENTOR.
Lawrence S. Williams
BY
Marshall and Marshall
ATTORNEYS Patented Jan. 15, 1952

2,582,517

UNITED STATES PATENT OFFICE 2,582,517

LABORATORY BALANCE

Lawrence S. Williams, Toledo, Ohio, assignor to Toledo Scale Company, Toledo, Ohio, a corporation of New Jersey Application July 18, 1946, Serial No. 684,483

7 Claims. (Cl. 265—54)

This invention relates to weighing scales and in particular to weighing scales of the type designated generally as laboratory balances.

In laboratory work it is necessary that the technician be equipped with a weighing scale of extreme sensitivity so that various analyses can be made with an extremely high degree of accuracy. The most common type of laboratory balance is an even-armed hanging pan type of scale equipped with relieving gears which lift the beam of the scale off its bearings when a load or counterbalancing weights are being placed on either of the two pans. This type of scale, while extremely accurate also is very slow because of the necessity for operating the relieving gear each time a weight is placed on or taken off the weight receiving pan. The necessity for snubbing the swinging pans of a laboratory balance of this type further slows up the operation of such a balance.

It is the general object of this invention to provide a weighing scale having a high enough degree of sensitivity to function as a laboratory balance and yet be equipped with mechanism of the type employed in commercial scales so that the speed of operation is made many times as fast as that of the conventional laboratory balance.

These objectives are achieved through the use of commercial scale components which are refined in their design and construction so as to contribute a minimum of error to the operation of the weighing scale. In analyzing the components of a weighing scale to determine how each could be bettered it was found necessary to isolate the error introduced by each component into the total error of the scale and to so modify each of these parts as to eliminate or greatly reduce these errors. For example, in conventional laboratory balances the weight receiving pans are hung below the weighing beam and are likely to oscillate in a pendulum-like manner. In commercial scales on the other hand the weight receiving platters usually are mounted above the scale beam and are maintained in stable condition through the use of check links. It was found that conventional check links introduce errors of large proportion and in the development of the instant laboratory balance I have invented check links which eliminate all but a negligible small fraction of a grain of error caused by the check links themselves.

Similarly, I have analyzed the design and construction of the bearings and pivots, of counterforce structures, and motion damping devices, and of the indicator mounting means and have so modified or redesigned conventional structures or invented novel structures that upon combining them I have constructed a scale having the advantage of high-speed operation and providing accuracy comparable to that existing in the slow conventional style balances.

It is well known in the art that a projected indication affords one of the simplest means of achieving wide indicator travel for small increments of weight. This very fact, however, while essential to accuracy, results in it being difficult to gauge the approach to balance or to estimate the degree of out-of-balance existing at the start of the weighing operation.

A primary object of this invention is to provide an indication which will permit a rapid determination of the correct number of large increments of weight required to counterbalance an unknown weight for example, a still rapid but more accurate determination of the next smaller increments of weight and finally, an equally rapid but highly magnified indication of the fractional portions of grains required to reach accurate balance.

In the drawings:

Figure I is a view in elevation of a laboratory balance embodying the invention, its housing being shown in section and certain parts of the device being broken away and shown in section to more clearly illustrate their operation.

Figure II is a plan view of the balance shown in Figure I with its platters removed.

Figure III is a fragmentary elevational view on an enlarged scale of the main lever of the weighing scale mechanism shown in Figures I and II.

Figure IV is a vertical sectional view taken substantially on the line IV—IV of Figure I.

Figure V is a plan view taken substantially from the position indicated by the line V—V of Figure IV and shown on a slightly reduced scale.

Figure VI is a fragmentary sectional view taken substantially from the position indicated by the line VI—VI in Figure I and shown on an enlarged scale.

Figure VII is a greatly enlarged fragmentary view in elevation of the main pivot and bearing employed with the lever illustrated in Figure III.

Figure VIII is a fragmentary vertical sectional view taken substantially on the line VIII—VIII of Figure VII.

Figure IX is an isometric view in detail and on an enlarged scale of the bearing means illustrated in Figures VII and VIII.

Figure X is an enlarged detail view, partly in elevation and with certain parts broken away, taken substantially on the line X—X of Figure II.

Figure XI is a vertical sectional view taken substantially on the line XI—XI of Figure X.

Figure XII is a fragmentary plan view of a variable poise.

Figure XIII is a detail view in section taken substantially on the line XIII—XIII of Figure XII.

Figure XIV is a vertical sectional view taken substantially on the line XIV—XIV of Figure X.

Figure XV is a fragmentary view in elevation of the indicator employed in the weighing scale illustrated in the figures and taken substantially from the position indicated by the line XV—XV of Figure I.

Figure XVI is a fragmentary vertical sectional view taken substantially from the position indicated by the line XVI—XVI of Figure XV.

Figure XVII is a fragmentary plan view on an enlarged scale of a mirror mounting bracket employed in the device illustrated in Figures I and II.

Figure XVIII is a fragmentary vertical sectional view taken substantially on the line XVIII—XVIII of Figure XVII.

Figure XIX is a fragmentary vertical sectional view taken substantially on the line XIX—XIX of Figure XVII.

Figure XX is a fragmentary detail view partly in section of indicator drive means and is taken substantially from the position shown in line XX—XX of Figure XVI.

Figure XXI is a fragmentary plan view taken substantially from the position indicated by the line XXI—XXI of Figure XV.

Figure XXII is a fragmentary vertical sectional view taken substantially on the line XXII—XXII of Figure XXI.

Figure XXIII is a detail view of pivot and bearing means employed with the mechanism illustrated in Figure XXII.

Figure XXIV is a fragmentary view in elevation taken substantially from the position indicated by the line XXIV—XXIV of Figure XVI.

Figure XXV is a fragmentary view in elevation taken from the right of Figure XXIV.

Figure XXVI is a view in elevation of the chart and indicating means employed in the weighing scale illustrated in the figures.

Figure XXVII is a vertical sectional view on an enlarged scale of motion damping means employed in a weighing scale embodying the instant invention.

Figure XXVIII is a fragmentary detailed view in elevation taken from the upper right hand side of Figure XXVII.

A weighing scale embodying the instant invention may be erected on a main frame 1 which is substantially rectangular in plan view and serves to support the entire mechanism. The frame 1 is given rigidity by constructing its webs with substantial vertical dimensions and yet maintained light by making the members relatively thin. For example, in Figure I there is shown in cross section a cross web 2 of the frame 1. A fulcrum stand 3 which is substantially U-shaped is fixed on the upper edges of the side members of the frame 1 (see also Figure XI) and has two upwardly extending posts 4 which mount the fulcrum bearings of a main even-arm lever 5. The lever 5 has a pair of transversely extending knife edge pivots 6 which are set into dove-tail slots 7 milled across the under surfaces of the side frames of the main lever 5. The pivots 6 each rest on the peripheries of a pair of ball bearings 8 (Figure IX) which are journaled by their balls on a horizontal pin shaft 9. The shaft 9 extends through a horizontal bore 10 in a bearing block 11. The bearing block 11 has a downwardly turned V-edge 12 which rests in a V-groove 13 milled across the top of the post 4 of the fulcrum stand 3. The post 4 has a substantially rectangular cross section and a vertically bored hole 14 of substantially circular cross section at its center. The V-groove 13 intersects the upper end of the circular hole 14 and also intersects a rectangular milled slot 15 which extends across the upper end of the post 4 at right angles to the V-groove 13. The bearing block 11 rests in the V-groove 13 and is retained therein against longitudinal movement by a thrust plate 16 located at one end and a resilient clip 17 located at the other end, both the plate 16 and clip 17 being secured to the post 4. The pin shaft 9 is retained in the bearing block 11 by a formed retaining clip 18 which resiliently grasps cone-pointed ends of the shaft 9 and has a U-shaped body extending downwardly into the upper end of the hole 14.

Side thrust on the main lever 5 which would be transmitted through its pivots 6 is absorbed on each side by an adjustable thrust screw 19 which is threaded horizontally through a resilient member 20 that is secured to the post 4 just beneath the transverse slot 15.

A load platter 21 (Figure I) is mounted on the upper end of a load spider 22 which is pivotally supported on the "left" arms of the main lever 5. A somewhat similar weight pan 23 is mounted on a weight spider 24 which is pivotally supported on the "right" arms of the main lever 5. The spiders 22 and 24 are cup-shaped and have two arms 25 (Figure IV) which extend transversely across the main lever 5 to support the spider on the lever 5. At the end of each of the arms 25 there is located an inverted bored and slotted pivot post 26 which is constructed subtstantially identically with the upper end of the fulcrum post 4 and which carries a bearing block 27 in its inverted V-groove 28. A knife edge pivot 29 is associated with each of the spider bearing blocks 27. The pivots 29 are mounted in transversely milled dove-tail slots cut through the upper surfaces of the arms of the main lever 5 with their pivot edges lying on the same plane as the pivots 6; two of the pivots 29 serving to support the load spider 22 and the other two of the pivots 29 serving to support the weight spider 24.

In a weighing scale having an extreme degree of accuracy it is necessary to maintain the bearings and pivots with as nearly a perfect and unchangeable longitudinal distance between them as is possible. Inasmuch as the pivot distance, i. e. the distance from the pivot line of the fulcrum pivots 6 to the pivot lines of the knife edge pivots 29 establishes the ratio of the weighing scale lever 5 any slight change in these distances will cause an inaccuracy in the operation of the scale. Since the pivots are fixed in their dovetail slots in the lever 5 there is very little possibility that the distance between their knife edges will change except by deflection or temperature change in the length of the main lever 5. It is equally important that the distances between the surfaces of the main bearings 8 and of similar load bearings 30 which are supported by the bearing blocks 27 on which the pivots 29 rest be maintained with equal accuracy. Because of the present construction, i. e. because the knife edges rest on the peripheries of cylindrical surfaces any longitudinal change in position of these cylindrical bearing surfaces also results in a vertical change in position of the lines of contact between the pivots and their bearing surfaces. This also will introduce error into the scale. To prevent any change in the position of the bearings 8 and 30 with respect to each other and to hold them spaced from each other the same distance as the edges of their associated pivots 6 and 29, there is provided a pair of stabilizing ribbons 31 one of which is associated with each group of three pivots, i. e. pivot 29 of the load spider, main pivot 6 and pivot 29 of the weight spider.

Each of these stabilizing ribbons 31 is firmly secured at the outermost end of that "left" arm of the lever 5 along which it extends by means of a retaining clip 32 (Figures II and III). The ribbon 31 is secured to each of the bearing blocks 27 and to the bearing blocks 11 with which it is associated by being crimped and tightly forced into a slot 33 which is cut in a projection 34 formed on the lower flat surfaces of the bearing blocks 27 and the upper flat surface of the bearing block 11. Tension is applied and maintained on each of the ribbons 31 by a resilient U-shaped clip 35 which is secured to the end of the ribbon 31 by screws 36 and which is mounted in the end of the arm of the main lever 5 opposite to that end of the lever 5 to which the ribbon 31 is attached. The clip 35 exerts constant tension on the ribbon 31 holding all of the bearing blocks tightly in position with the ribbon 31 taut.

The bearing blocks 11 are equipped with two L-shaped retainer clips 37 as are each of the bearing blocks 27 for preventing the accidental displacement in a vertical direction of the ribbons 31 and the bearing blocks. The bearing blocks 27 are equipped with thrust plates 38 and resilient retaining clips 39 which are similar to the plate and clips 16 and 17 and which are attached to the pivot posts 26 of the spider. It is to be noted that the plates 16 and 38 are on the sides of the fulcrum post 4 and pivot posts 26 toward which the bearing blocks are pulled by the tension on the ribbons 31. This maintains the bearing blocks 27 and the spiders which they support at fixed distances from the fulcrum posts 4 and since the ribbons 31 are attached to the lever 5 as well, they hold the entire structure so far described in fixed relationship. However, since the resilient retaining clips 17 and 39 are mounted on the opposite sides of the bearing blocks and since the resilient clip 35 would permit the ribbons 31 to be displaced slightly this resiliency both in the retaining clips 17 and 39 and the ribbon tightness clip 35 absorbs any slight shocks to which the mechanism might be subjected and therefore prevents damage to the structure.

Each of the spiders 22 and 24 is equipped with a pair of thrust screws 40 (Figure IV) which bear on the outermost ends of the pivots 29 to absorb sidewise thrust on the spiders 22 and 24. Each of the thrust screws 40 is adjustably mounted in a resilient thrust absorbing member 41 which is secured to its pivot post 26 by a pair of screws 42 and which has a stop screw 43 in its loose end to stop its movement against the arm of the lever 5 with which it is associated.

In order to insure that the spiders 22 and 24 move vertically there is provided a check link system which maintains a weighing parallelogram in the manner usually employed in even-arm balances which have their weight and load receiving platters above their main lever. In scales of this type the check link system is often a source of error since it introduces friction into the operation of the scale. In a scale as accurate and sensitive as the present balance the amount of friction introduced by a conventional pin-mounted check link or even an improved check link employing knife edge pivots and bearings would destroy the accuracy of the scale. The check link system employed in this balance consists of two tubular links 44 which extend between a center check link post 45 (Figure XI) depending from the under side of the fulcrum stand 3 and posts 46 (Figures IV and VI) which are adjustably mounted in the bottoms of cup-shaped portions 47 of the spiders 22 and 24. Each of the tubular links 44 is flattened and horizontally drilled at its outer end thus forming an outer race 48 for a group of bearing balls 49. A small plate 50 is spot welded on one side of the flattened portion of the end of the link 44 and a similar plate 51 is spot welded on the other side of the flattened portion of the link 44. The plate 51 has a centrally located hole 52 which is concentric with the hole bored through the flattened end of the link 44. The plates 50 and 51 serve to retain the balls 49 within their race 48. A cone-pointed tenon 53 extends through the hole 52 into the check link where it is supported by the balls 49. The tenon 53 is formed on the end of an adjustable screw 54 which is threaded horizontally through one of the arms 55 of a bifurcated stud 56 extending downwardly from the check link post 46 of the spider 24. A cone-pointed thrust screw 57 is threaded through the other arm 58 of the bifurcated stud 56. The cone-points on the thrust screw 57 and the tenon 53 bear on opposite sides of the plate 50. The construction of the outer end of the other one of the links 44 which is attached to the load spider 22 is identical with the construction just described.

The stud 56 is vertically slidable within the post 46 and is prevented from turning therein by a pin 59 which extends transversely through the stud 56 and is engaged in a slot 60 milled in the lower end of the post 46. An adjustment screw 61 passes through a pair of spacers 62 bearing on the inner surface of the bottom of the cup portion 47 and is threaded into the upper end of the bifurcated stud 56. A coil spring 63 surrounds the stud 56 being located between the lower end of the post 46 and a shoulder 64 in the stud 56 just above its bifurcated portion. Rotation of the screw 61 draws the stud 56 up into the post 46 compressing the spring 63 permitting accurate, continuous, vertical adjustment.

The centrally located ends of the links 44 are mounted between the three downwardly extending arms of the central check link post 45 in a manner similar to that in which the outer ends of the links are mounted in their studs 56. The central post 45 is threaded into a boss 65 (Figure XI) formed on the under side of the fulcrum stand 3 and has three arms 66, 67, and 68 at its lowermost end. A pair of plates 69 and 70 are welded one on each side of the flattened portions of each of the links 44, the plates 70 having holes 71 which are concentric with larger holes 72 horizontally bored through the flattened ends of the links 44. Bearing balls 73 which are located in the races thus formed support cone-pointed tenons 74 of adjustable screws 75 which are oppositely directed and threaded through the two arms 66 and 68 toward each other. The central arm 67 has a hole 76 concentric with the adjustable set screws 75 and the holes through which they are threaded. A pair of larger bearing balls 77 are located within the hole 76 and serve as inside thrust members for the two links 44, the surface of one of the balls 77 and the cone-point of one of the tenons 74 pressing on opposite sides of each of the plates 69.

Thus, by adjustment of the screws 54 and 75 on which are formed the cone-pointed tenons 53 and 74 the check links 44 can be almost frictionlessly maintained in position. Each of the check links 44 has a series of holes 78 drilled through its upper wall with their center lines falling on a plane lying at right angles to the center lines of the tenons 53 and 74, i. e. the plane of movement of the check links 44. By thus lessening the weight of the upper portion of the check links 44 with respect to the lower portion thereof they are given a slight amount of pendularity which insures their hanging vertically on their support tenons 53 and 74 and prevents tipping which would cause the check links to bind against their thrust members (the various cone-pointed screws and the balls 77).

Since the vertical length of the central check link post 45 is fixed and the spider check link posts 46 are vertically adjustable, the parallelogram can be accurately set and maintained with the check links 44 being kept substantially parallel to the arms of the main lever 5 beneath which they lie. Vertical movement of the load spider 22 and load platter 21 and of the weight spider 24 and weight platter 23 and, consequently, the "lever arm" through which weights on the platters 21 and 23 act, can be kept constant and identical, thereby insuring accurate balancing.

The vertical adjustment of the check link studs 56 which is made possible by the construction above described affords a simple and highly accurate means of correcting so-called "ratio errors." In the construction of a delicate balance it is almost impossible to so carefully machine the various parts that the lengths of the two arms of the main lever are identical or even extremely close to identical. For example, if the length of the "right" arm of the lever as shown in Figure I were only a fraction of a thousandth of an inch longer this length of the lever arm when multiplied by the load carried on the weight spider 24 would create a moment the entire force of which would contribute error to the scale. It is necessary, therefore, to provide some means for correcting this error which can be adjusted to effect the correction after the scale is assembled.

The lengthening or shortening of the check link post 46 (i. e. moving the stud 56 vertically therein) distorts the "weight parallelogram" and as a result the weight spider 24 no longer remains precisely vertical but rotates slightly about the pivot axis as the lever oscillates. The moment of weights placed on the weight platter 23 changes in direction depending upon whether the post 46 has been shortened or lengthened and in amount according to the distance of the weights from a vertical plane through the knife edges. Thus, errors which occur because of a change or an original error in the "ratio" can be compensated for by the vertical adjustment of the check link post.

This method of adjusting for ratio errors, however, since it is a reversal of the usual reason for the use of check links in a scale of this type, requires that the weights which are placed on the weight platter 23 be placed always a precise distance from the center line of the pivots 29 which support the weight spider and the platter 23. If the weights were not always placed at the same distance from this pivot line but, instead, were placed either closer to the fulcrum pivot 6 or farther from the fulcrum pivot 6 their moment about the fulcrum pivot would be changed very drastically since the adjustment already described tips the weight spider and its effective loading point shifts about the center line of its pivots instead of remaining directly thereon as it does when the weight spider is maintained vertical. The weight receiving platter 23 (Figures IV and V) is mounted on the upper end of a pair of posts 79, which are studded into the arms of the spider 24, by means of two dowels 80 which extend downwardly into bores 81 drilled in the upper ends of the posts 79. The dowels 80 are retained in the bores 81 by a pair of pointed set screws 82 which engage with notches 83 cut in the dowels 80. A hole 84 is drilled through the weight receiving platter 23 and is located generally above the head of the check link post adjusting screw 61 so that a screw driver can be inserted through the hole for adjusting the screw. A weight positioning fence 85 (Figure V) is fixed on the weight receiving platter 23 with the 90° angle between its arms bisected by a vertical plane that is spaced from a vertical plane through the edges of the pivot 29. The fence 85 is designed for use with weights having a circular horizontal section and thus, regardless of the diameter of such weights, when they are positioned against and between the arms of the fence 85 their centers of gravity are correctly spaced from the center line of the pivots 29 and thus the effective lever arms of all the weights used are the same length. This same result may be achieved in other ways, as for example, by the positioning of a short post on the weight platter and the use of weights with vertical holes that fit over the post. The load platter 21 is mounted on the upper end of the load spider 22 in a manner identical with that in which the weight platter 23 is mounted on the weight spider 24.

The main lever 5, while spoken of in general as a two-arm lever, actually is an open grill which has two side members and several webs connecting the two side members. These webs are employed not only to form the frame of the lever but also one of the main webs 86 (Figures II and III) carries a pair of balancing weights 87 and 88 which are used for balancing the lever 5 to permit the scale to be employed in "out-of-level" condition and still to weigh accurately when in such condition. If the lever 5 were not balanced about the line of its fulcrum pivots 6, and one end of the scale were lifted, the mass of the lever 5 would act as a pendulum and would require a certain amount of the weight on either the load platter 21 or weight platter 23 to overcome its pendularity and, therefore, identical weights on the two platters would not result in a balance. The weights 87 and 88 are threaded on studs 89 and 90 respectively which extend horizontally and downwardly from the web 86 of the lever 5. By adjusting the position of the two weights 87 and 88 on their respective studs the lever 5 can be completely balanced so that the indication of balance will not change when the scale frame is tilted longitudinally.

In an even-arm balance where weighing is done by the placing of an unknown load on one arm of the balance and the placing of weights on the other arm until the scale reaches a balanced condition, a great deal of oscillation is likely to take place when the loads on the two platters are equal. This condition makes the reading of any indication extremely difficult. This tendency of a weighing scale to oscillate when in balance is overcome in commercial weighing scales by the use of some form of motion damping device. In the fine balance here described a motion damping device is employed to limit the oscillations which take place but, since the balance is extremely sensitive this motion damping device has also had to be studied and revised to remove as great an amount as possible of the friction inherent in such structures. Figures XXVII and XXVIII illustrate the motion damping dashpot employed in the present device. This motion damping dashpot consists of a cup 91 in which there is placed a quantity of a fine oil. A diaphragm 92 is riveted on the lower end of a piston rod 93 which is threaded and pinned into a bushing 94. The bushing 94 is grasped between the bifurcations of a lower arm of a C-shaped bracket 95. An ear 96 extends upwardly from the bushing 94 and is pierced with a horizontal hole 97 which forms a race for a group of bearing balls 98. Two plates 99 and 100 are spot welded on opposite sides of the ear 96, the plate 100 having a hole 101 which is concentric with the hole 97 cut in the ear 96. An elbow 102 is fixed by a set screw 103 in an arm of the main lever 5 extending horizontally therefrom and being turned downwardly at its end where it is riveted to the cross arm of a U-shaped yoke 104. A cone-point set screw 105 is adjustably threaded through one arm of the yoke 104 and has a tenon 106 which extends through the hole 101 in the plate 100, being supported by the bearing balls 98 with its cone-point against one side of the plate 99. Another cone-point screw 107 is threaded through the other arm 104 with its cone-point lying on the opposite side of the plate 99 from the point on the screw 105 and concentrically therewith.

At the upper end of the C-shaped bracket 95 there is located an adjustable weight 108 which is ring shaped and fitted on a short sleeve 109. The weight 108 is positioned on the sleeve 109 by a horizontal set screw 110. The sleeve 109 is secured to the bracket 95 and fixed in position horizontally thereon by a screw 111 which passes through a washer 112 overlying the upper end of the sleeve 109 and is threaded into the bracket 95. The body of the screw 111 is of a diameter smaller than the inside diameter of the sleeve 109. Therefore, when the screw 111 is loosened the position of the sleeve 109 and the weight 108 mounted thereon can be shifted horizontally. Similarly, by loosening the screw 110 the weight 108 can be moved vertically. These two adjustments provide for counterbalancing the weight of the diaphragm 92 and its connecting rod 93 and balancing drag out of the connection formed by the balls 98 and tenoned screw 105.

The ease with which the diaphragm 92 moves vertically in the oil which is contained in the cup 91 depends upon how swiftly the oil is permitted to flow through a hole 113 which is drilled in the diaphragm 92. This is controlled by a bimetallic baffle 114 which overlies the hole 113. The baffle 114 is substantially "U-shaped," one arm of the U being secured to the upper surface of the diaphragm 92 and the other arm of the U continuing over and down to overlie the hole 113 and having a hole 115 through which the connecting rod 93 passes. The lower end of a sleeve 116 presses against the upper surface of the upper arm of the baffle 114 and is secured on a knurled thumb nut 117 which is threaded on the upper end of the connecting rod 93. The resiliency of the body of the baffle 114 tends to spread its two arms so that by vertically adjusting the thumb nut 117 and the sleeve 116 the distance between the arm of the baffle 114 which overlies the hole 113 and the diaphragm 92 can be adjusted to vary the flow of oil through the hole 113. The baffle 114 is bimetallic in order that its arm will flex with temperature changes and compensate for change in viscosity of the oil within the cup 91. A centrally pierced cap 118 is threaded on the upper end of the cup 91 to exclude dust and other foreign matter.

The mechanism which has so far been described constitutes the load receiving and counterbalance weight receiving structure of the scale and the main lever of the scale on which these structures are supported and that mechanism ancillary thereto for maintaining these members in accurate balanceable condition. This mechanism alone is sufficient both to support a load being weighed and to counterbalance such load with a degree of accuracy hitherto unknown in scales of this semicommercial type. However, in order to determine when a balance has been reached indicating means are required capable of the same degree of accuracy as the weighing means already described.

Indicating mechanism

The indicating system of the scale incorporates both a direct mechanical indication and a projected indication. By utilizing the "throw" of a projection system it is possible to achieve large movement for small changes in balanced condition, and thus a high degree of accuracy in the indication of small increments of weight. The very fact, however, that a projected indication has a wide travel for a small change in weight results in it being difficult to sense the approach of the scale to a condition of balance and to avoid "over running" the balance point. For that reason a direct mechanical indication which is much less definitive than the projected indication also is employed in the instant invention.

The indicating mechanism is driven from an arm 119 (Figure II) which is an extension on the right end of the main lever 5. At the end of the arm 119 there is adjustably mounted a two-arm drive yoke 120 (Figures XX and XXI). The yoke 120 is vertically slidable on a pair of pins 121 which are studded into the end of the arm 119. The yoke 120 has a slot 122 in which the pins 121 slide and through which extends a set screw 123 which is threaded into the end of the arm 119. The yoke 120 has an upper horizontally extending arm 124 in the end of which is riveted a cone-pointed pivot 125. The pivot 125 engages in a cone-socketed jeweled bearing 126 which is located in the upper end of a tube 127 and pressed upwardly therein by a spring 128 which also presses on a similar bearing 129 located in the lower end of the tube 127. The bearings 126 and 129 are retained in the tube 127 by a pair of caps 130. The bearing 129 is engaged with a second cone-pointed pivot 131 which is riveted in the horizontal cross arm of a stirrup 132 (see also Figure XXII). A lower arm 133 of the yoke 120 has a vertically adjustable retaining screw 134 threaded through its end and located coaxially with the pivot 125 and with its upper end a sufficient distance below the stirrup 132 to prevent engagement therebetween but to limit the movement of the parts with respect to each other and prevent disengagement of the cone-pointed pivots from their jeweled bearings.

The stirrup 132 is swivably mounted on a pair of horizontally extending pins 135 (Figures XXI and XXII) secured in slots 136 on the faces of bifurcations 137 of an indicator body 138. The indicator body 138 has a pair of oppositely extending knife edge pivots 139 each of which rests in a V-slot 140 cut in a disk bearing 141 (Figure XXIII). The bearings 141 are each adjustably mounted in a collar 142 which contains a thrust plate 143 engaged with the end of the pivot 139, annular spacing rings 144 and a retaining ring 145 which is threaded into the collar 142 to hold the parts assembled therein. The collars 142 are mounted in a pair of bored ears 146 and 147 which are formed on an indicator stand 148 erected on the end of the main frame 1. The collars 142 are secured in their respective ears 146 and 147 by retaining screws 149. A boss 150 is formed on the back of the indicator body 138 to balance the bifurcations 137 and a screw 151 is threaded into the end of the boss 150 so that by adjusting it in and out a final balance can be reached.

One end of a loop counterforce spring 152 is secured by means of a screw 153 to the indicator body 138. The other end of the counterforce spring 152 is adjustable retained in a pair of clips 154 which are mounted on an arm 155 formed as an integral part of the ear 147. The retaining clips 154 are vertically adjustable in a slot 156 milled in the surface of the arm 155 and are flared away from each other at their upper ends. One of the clips 154 has a substantially U-shaped cross section and the other clip is rectangular in cross section to fit between the arms of the U and clamp the loop counterforce spring 152 in the base of the U. The two clips 154 are retained in the slot 156 by a plate 157 secured to the arm 155 by a pair of horizontally extending screws 158. The counterforce spring 152 is slidable vertically between the clips 154 and adjustable therebetween so that its effective counterforce can be adjusted to the desired amount.

A socket 159 is brazed or welded on the upper portion of the indicator body 138 with its center line lying on the vertical plane of the edges of the pivots 139. The socket 159 mounts an upwardly extending indicator arm 160 at the uppermost end of which there is formed a flattened pointer 161 (Figure XV). A similar socket 162 is brazed to the underside of the indicator body 138 coaxially with the socket 159 and mounts a downwardly extending indicator arm 163. The pointer 161 sweeps along the arcuate edge of a chart 164 which is fixed on the uppermost end of an arm 165 in turn mounted on a bracket 166 which is adjustable secured near the upper end of a vertically extending post 167. The post 167 is studded into a portion of the indicator stand 148. The chart 164 has a series of over and under indicia 168 disposed along its lower arcuate edge. In Figure XXVI the series of indicia 168 is shown in solid lines and includes a plus sign and a minus sign; the plus sign being at the right end of the series of the indicia 168 and the minus sign at its left end.

It will be noted that the series of indicia 168 is divided into forty minor divisions, twenty on each side of the center line. The weighing scale embodying the instant invention is so adjusted that the indicator arm 160 and its pointer 161 move from the center or balance position to the outermost one of the indicia in the series 168 in response to a change in balance between the loads on the load receiving platter 21 and weight receiving platter 23 of twenty grains. Therefore, each of the minor divisions in the series of indicia 168 corresponds to a weight of one grain when indicated by the pointer 161.

Although the weighing scale is a balance, i. e. it is designed so that a load being weighed is to be counterbalanced by weights deposited on the load receiving platter 23, slight degrees of out-of-balance, i. e. as much as twenty grains are directly indicated by the pointer 161 cooperating with its series of indicia 168. This indication of as much as twenty grains over or under balanced position results from the counterbalancing of this amount of weight by the loop counterforce spring 152. It is necessary therefore for the loop counterforce spring 152 to be delicately adjustable so that its effective counterforce can be adjusted to accurately measure amounts of out-of-balance of as much as twenty grains in either direction in fine increments.

There also is afforded in this balance an indication of finer degrees of out-of-balance in which the series of indicia 168 on the chart 164 represent a total change of plus or minus two grains and each of the individual indicia in the series 168 represents a change in balance of one-tenth of one grain. This indication is provided by a projection system. This projection system consists of a lamp 169 (Figure XVI) which is mounted in a bracket 170 located between the side walls of the base 1 on a horizontal web 171 of the main frame 1. Condensing lenses are located in a sleeve 172 which is secured to the underside of the web 171. The lamp 169 and the condensing lenses in the sleeve 172 form a projection path or beam of light which extends horizontally at right angles to the plane of oscillation of the indicator arm 163.

A bracket 173 is fixed on the lowermost end of the indicator arm 163 and has a downwardly extending pointer 174 at its lowermost end. The pointer 174 extends downwardly a sufficient distance so that its arc of travel intersects the center line of the projection path of the condensor lenses 172 when the scale is at balance and the indicator arms 160 and 163 are vertical (as shown in Figure XV).

A pair of projection lenses 175 and 176 are mounted each in one of a pair of concentric sleeves 177 and 178 respectively. The sleeve 178 is threaded into a horizontal bore 179 of a lens tube 180 which is mounted in an ear 181 formed on the web 171. The sleeve 177 telescopes over the sleeve 178 and has a downwardly extending ear 182 in which is threaded an adjusting screw 183. A spring 184 surrounds the screw 183 and presses against the ear 182 to hold the sleeve 177 at the limit of its adjustment, the screw 183 being located in the lower wall of the lens tube 180.

A mirror 184 is fixed to the end of the lens tube 180 at the intersection of the center line of the projection path of the lenses 175 and 176 and at a 45 degree angle thereto to reflect the image of the pointer 174 which is projected by projection lenses upwardly and out of a vertical bore 185 in the lens tube 180. The light carrying the image of the pointer 174, after leaving the mirror 184, travels upwardly until it hits the surface of a mirror 186 (Figures I and XV) which is mounted on an arm 187 of the bracket 166. The mirror 186 reflects this beam of light onto the chart 164 where the image of the pointer 174 appears as shown by the broken shadow indicated by the numeral 174 in Figure XXVI.

The ratio between the lengths of the indicator arms 160 and 163 including the pointers 161 and 174 and the optical ratio of the projection system described are such that the image of the pointer 174 moves ten times as far across the chart 164 with respect to the series of indicia 168 as does the pointer 161 for the same increment of weight. For example, if a weight of two grains were placed on the load platter 21 the indicator arm 160 would swing the pointer to that one of the indicium of the series of indicia 168 indicated by the letter a in Figure XXVI whereas the shadow of the pointer 174 would fall in line with that indicium in the series of indicia 168 indicated by the letter A in Figure XXVI. The movement of the shadow of the pointer 174 across the chart is caused by the movement of the pointer 174 to one side of the axis of the projection path of the projection system.

This movement of the shadow across the chart is extremely fast as can be seen from the fact that a change in weight of only two grains causes it to move from zero to the extreme edge of the chart. In the meantime, however, the pointer 161 has moved only two of the individual increments of weight indicated by the indicia in the series 168. Thus the pointer 161 gives a gross indication of the degree of out-of-balance existing in the scale and the projected shadow of the pointer 174 gives a fine indication of the degree of out-of-balance of the scale. For example, if it is desired to weigh out a predetermined quantity of a fluid, weights totaling the desired weight of the fluid plus the weight of its container are placed on the weight platter 23 and the empty container placed on the load platter 21. Liquid is then poured into the container rapidly until the pointer 161 (which by virtue of excessive weight on the weight platter 23 is at the far left side of the chart as shown in Figure XXVI) leaves the leftmost indicium in the series 168. The speed of pouring can then be slowed down slightly but continued until the pointer 161 approaches the second indicium to the left from the center of the series of indicia 168. At this point the rate of pouring should be substantially reduced and when the second indicium to the left is reached by the pointer 161 the shadow of the pointer 174 appears at the left side of the chart 164. The liquid is then poured with a decreasing rate of flow as the shadow approaches the zero or center indicium until it is brought exactly into balance by the addition of the last drop of liquid.

Similarly, if the weighing problem is not the measuring of a predetermined quantity but the weighing of an unknown quantity, the loads can be placed on the platter 21 and weights can be placed on the platter 23 in increments of at least twenty grains at a time until the pointer 161 leaves the right side of the chart 164 whereupon lesser increments of weight can be added until the shadow of the pointer 174 appears at the right side of the chart 164 and the remaining not-counterbalanced portion of the weight can be read directly from the chart.

Although the provision of these two cooperating indicating means provides not only a high degree of accuracy but also an opportunity to determine the approach of the scale to a balanced condition, it also is desirable to be able to estimate the weight of an unknown mass being weighed so that weights of large increments of value, say ounces or more, can first be used in an attempt to counterbalance the unknown weight and the weights of smaller value added only after a balanced condition has been reasonably approached. For this reason there is provided a gross weight estimator. This mechanism makes use of the projection system already described and of a separate counter force mechanism which will counterbalance as much as sixteen ounces over or under balance. This counterbalance consists of a spring leaf 188 (Figures II, XV et seq.). The leaf 188 is sandwiched and welded at the end of a mounting bar 189 (Figure XXV which is rockably mounted for adjustment in a vertical plane by a pair of screws 190 on a semicylindrical rocker 191. A right angle notch 192 is milled across the bar 189 and a similar notch 193 is milled across a raised center plateau 194 of the rocker 191. A cylinder 195 is squeezed in the two notches 192 and 193 forming the bearing surface for the adjustment of the arm 189 with respect to the rocker 191. The rocker 191 rests in a notch 196 formed in the upper surface of a transverse web 197 of the indicator stand 148. Two surfaces 198 are machined on 45 degree angles to form the bearing surfaces for the rocker 191. The rocker is rotably adjustable on a horizontal axis in the notch 196 by a pair of screws 199, each of which bears on a plate 200 resting with one of its ends on the upper surface of the web 197 and the other one of its ends bearing on the shoulder of the rocker 191. Thus, by adjusting the screws 190 the leaf 188 can be swung angularly in a vertical plane and by adjusting the screws 199 it can be rotated on a horizontal axis at right angles to its angular movement.

The end of the leaf 188 extends between a pair of spaced bifurcations 201 (Figures XX and XXII) which are formed on a plate 202 mounted on the end of the arm 119 along with the yoke 120 and held in place thereon by the pins 121. The space between the bifurcations 201 is of such size that the movement of the arm 119 in response to out-of-balance conditions of twenty grains or less is insufficient to engage the leaf 188 with either of the bifurcations and thus, there is no interference by the leaf 188 with the counterbalancing action of the loop counterforce 152.

The bracket 173 (Figure XV) has an adjustable screw 203 threaded through each of its outermost arms 204 on a center line which is radial with respect to the pivot lines of the indicator pivots 139. Each of the screws 203 has a pointer 205 at its lowermost end and is so adjusted in the end of its arm 204 that the end of the pointer 205 lies on substantially the same arc as the pointer 174. The circumferential distances between the pointers 205 and the pointer 174 is such that the pointers 205 enter the projection path of the projection system of the scale when the leaf 188 engages the corresponding one of the bifurcations 201 and when the pointer 161 passes the last indicium at the right or left of the series 168. A double series of indicia 206 is printed on the chart 164 immediately above the series of indicia 168 and has two ranges, a plus range from zero to sixteen ounces and a minus range from zero to sixteen ounces. The pointers 205 and their screws 203 do not extend exactly the same distance into the projection path since it is necessary that the images of these pointers which are projected by the projection system be thrown to a different place on the chart 206 to cooperate with their respective lines of indicia in the series 206. As can be seen in Figure XXVI the shadow of the "under" pointer 205 follows along the uppermost or "under" series of indicia 206 while the "over" shadow follows in line with the "over" indicia in the series. In Figure XXVI both of the shadows of the pointers 205 are shown on the chart by the broken lines indicated by the numerals 205, but in actual operation of the scale only one of these shadows would appear on the chart at a time.

For example, if it were desired to weigh an unknown quantity of a commodity the commodity would be placed on the platter 21. This would swing the pointer 161 to the right to the limit of the series of indicia 168 and would introduce into the projection path the right hand one of the pointers 205, a shadow of which would be projected onto the chart 164 where it would fall somewhere along the series of indicia 206, let us say for example, in line with that indicium carrying the designation "12." This would indicate that the weight of material is approximately twelve ounces and this amount of weight would be counterbalanced by the engagement of the leaf 188 with the lower one of the bifurcations 201. It would then be possible to place upon the weight platter 23 eleven one ounce weights which would counterbalance that much of the load and would cause the shadow of the pointer 205 to move to the left approaching the zero ounce indicium. A half ounce weight could then be placed on the weight platter and then a slightly smaller weight until finally a sufficient amount of the load would be counterbalanced so that the pointer 161 would move away from the right side of the series of indicia 168. The remainder of the balancing procedure would be the same as that already described.

By means of the adjustment afforded for the leaf 188 it can be tilted and rocked to vary the amount of lost motion between it and its cooperating bifurcations 201 to determine at what point the leaf would engage the bifurcations. This is a delicate adjustment inasmuch as the leaf must not engage the bifurcations until exactly twenty grains out-of-balance condition exists and it must engage such bifurcations at exactly that time.

As was earlier explained with respect to the adjustable weights 87 and 88 (see Figure III) the instant balance is designed so that it will weigh accurately when slightly out-of-level. The weights 87 and 88 compensate for any pendularity which may exist in the main lever 5. Similarly, the indicator arm 160 carries a short sleeve 207 (see Figures XV and XVI) which is slit near its ends and crimped slightly to grip the indicator arm firmly to hold it in whatever position it is placed to balance the entire indicator unit comprising the indicator body 138, two indicator arms 160 and 163 and the brackets mounted on the arms. Thus, with the main lever 5 balanced in one vertical plane and the indicator balanced in a vertical plane lying at right angles thereto the scale will weigh accurately whether tilted sideways or fore and aft.

*Tare mechanism*

In order to facilitate the use of the balance for the weighing out of predetermined quantities of material it is equipped with a continuously adjustable poise mechanism having a maximum capacity of five hundred grains and provided with a projected indication to enable the amount of weight being counterbalanced by the poise to be directly read. The poise mechanism has a hand wheel 208 (Figure I) which forms a part of a friction clutch 209 mounted in a bracket 210 secured to the main frame 1 of the scale. The clutch 209 is fixed on the forward end of a shaft 211 the rear end of which is journaled in a pair of lugs 212 extending outwardly from a poise frame 213 secured to the side of the main frame 1 at approximately its center. A worm 214 which is pinned on the shaft 211 is in mesh with a worm gear 215 (Figure XI) which in turn is secured on the outermost end of a shaft 216. A drum 217 and a cam 218 also are fixed on the shaft 216. A pair of ribbons 219 are wound around and secured to the periphery of the drum 217 and their free ends are attached to one end of a horizontally movable slide 220. The opposite (right hand—Figures X and XII) end of the slide 220 is secured to a poise 221. The poise 221 is supported for travel along a U-shaped track 222 by a pair of flanged wheels 223 which are journaled on a pin 224 extending transversely through the poise 221. The track 222 is supported at one end on the main lever 5 by means of a bracket 225 (Figure XIV) which is riveted to one of the side webs of the lever 5. The track 222 is adjustably secured to the bracket 225 by a bolt 226, the head of which is riveted in the cross member of the track 222 and a pair of adjusting screws 227 which are threaded through the bracket 225 and bear on the under surface of the track 222. The other end of the track 222 is supported on a bracket 228 which depends from the main lever 5 near its midpoint. A resiliently adjustable bolt 229 passes through a lug on the bracket 228 and is riveted to the bottom of the track 222. The bolt 229 is raised or lowered to adjust the angular relationship between the track 222 and the main lever 5.

A third ribbon 230 is secured to and wound around the drum 217 at one end and its opposite end is attached to the underside of an adjustable slide 231 which is fitted in a bore 232 in the poise 221. A spring tensioned adjusting screw 233 is threaded into the end of the slide 231 and bears against the poise 221 to apply tension to the ribbon 230.

Thus, when the hand crank 208 is rotated, through the worm 214 and worm gear 215, the shaft 216 and the drum 217 are rotated. This wraps or unwraps the ribbons 219 and 230 which moves the slide 220 and the poise 221 longitudinally, the poise riding in the track 222 and being supported thereby on the lever 5. As the poise is moved farther away from the main pivot and bearing of the lever 5 it applies a progressively greater moment to the lever and consequently will counterbalance progressively greater loads placed on the load receiving platter 21. It thus would be possible to place an empty container on the load platter and by turning the hand crank move the poise away from the center of the lever 5 until its weight exactly counterbalanced the weight of the container. This would put the scale in balance and effectively "tare-off" the weight of the container.

It is desirable, however, to be able to read the amount of weight being counterbalanced by the poise. A separate projection system is provided for accomplishing this. This projection system has a lamp 234 which is adjustably mounted in a lamp bracket 235 fixed on an upper arm of the poise frame 213. A pair of condenser lenses which are located within a lens cell 236 supported by the bracket 235 throws a beam of light parallel to the center line of the main pivots of the lever 5.

A transparent indicia-bearing disk 237 is mounted on a flange 238 which is secured to the drum 217 by a plurality of cone-pointed set screws 239 threaded through a rim of the drum 217 and into an annular V-groove 240 cut in the hub of the flange 238. The transparent disk 237 carries a circularly arranged series of indicia ranging from zero to five hundred which rotate through the projection path of the condenser lenses 236 and are projected by a pair of projection lenses coaxially mounted therewith in a lens tube 241 which is fixed in a bracket 242 extending upwardly from the poise frame 213. By adjusting the set screws 239 in the groove 240, the disk 237 can be adjusted to insure that the indicia borne thereby are properly concentric with their axis of rotation and in register with the projection system. The ray of light carrying the image of the indicia on the transparent disk 237 passes through a cored hole 243 in the side web of the lever 5 and strikes a mirror 244 which is adjustably mounted on an elbow 245 extending inwardly from the post 4 of the fulcrum stand 3. The mirror 244 reflects the beam of light horizontally along the length of the lever 5 between its side webs and between the arms of the weight spider 24 until it strikes a second mirror 246 (Figure I) which is adjustably mounted on the end of an arm 247 located near the lower end of the post 167. The mirror 246 reflects the beam of light upwardly where it strikes the mirror 186 and is reflected onto the chart 164 to form a horizontally extending series of indicia indicated by the numeral 248 in Figure XXVI. This series of indicia is shown in broken lines in Figure XXVI because it is projected onto the chart. An index 249 (Figures XV and XXVI) is printed on the chart 164 in a position to lie adjacent the edge of the projected indication 248 and to show the exact value in tenths of grains of the load being counterbalanced by the poise 221. In this projected indication the index is stationary and the projected indicia move across the chart as the poise 221 is moved along the track 222.

Because of the long throw of the projection system and because of the consequent rapidity with which the projected indication moves across the chart it is difficult to read this indication without slowing up the movement of the poise almost to a stop. Therefore, there is provided a poise position estimator. An arm 250 (Figures X and XI) is supported by a leaf spring 251 from a depending arm 252 of the poise frame 213 and is pivoted on a pin 253 which is engaged in a slot 254 cut in the lowermost end of the arm 250. The pin 253 is riveted to an adjustably mounted bracket 255 secured to the arm 252. The upper end of the arm 252 is bent over horizontally to cross over the edge of the transparent disk 237 and carries an index arm 256 which extends down behind the transparent disk 237 and has an index 257 formed on its upper edge. The index 257 lies in the projection path of the lenses forming the poise projection system. The arm 250 has a tab 258 formed and bent over to ride the periphery of the cam 218. The cam 218 has a single spiral surface starting at the position corresponding to zero and ending at the position corresponding to five hundred grains of weight, i. e. when the poise 221 is at its most withdrawn position the cam 218 is so located with respect to the tab 258 of the arm 250 and is so mounted on the shaft 216 that the index 257 is in position to be projected by the poise projection system onto the chart 164 in line with the zero indicium in a series of indicia 259 printed on the chart 164. As the hand crank 208 is rotated and the poise 221 moved out on the track 222 the cam 218 rotates and through the tab 258 moves the arm 250 and index 257 to the right (Figure X) and a projected shadow of the index 257 to the right (Figure XXVI) across the chart 164 along the series of indicia 259. In Figure XXVI the projected indicia 248 are so shown with respect to their index 249 as to indicate that the poise is counterbalancing a weight of 358.8 grains. Similarly, a projected shadow of the index 257 (indicated by the numeral 257 in Figure XXVI) is positioned just short of that indicium in the series 259 corresponding to a value of 360 grains.

An arm 260 is formed on the drum 217, extending radially therefrom, to engage an adjustable stop screw 261 for positioning the drum at "zero."

Because of the delicate adjustments necessary to properly focus the poise projection system and to secure the proper angles of the mirrors 244 and 246 so that the indicia and index reflected thereby will be correspondingly positioned on the chart 164 there is provided an adjustable mounting means for the elbow 245 and for the mirrors 244 and 246. (In Figures XVII, XVIII and XIX these adjusting means are shown in detail.) In general the adjusting means comprises a small diameter cylinder resting in a groove cut in the one member, i. e. either the bracket or the adjusting member and clamped tightly therein by a screw or plate attached to the other member. One form of this mounting means is illustrated in Figure XIX and is substantially similar to that employed in the mounting of the leaf 188 illustrated in Figures XIV and XV. The elbow 245 has a semicylindrical portion 262 through which is cut a semicircular groove and in which groove is mounted concentrically with the body of the elbow 245 a small cylinder 263. A plate 264 is clamped against the periphery of the cylinder 263 by a pair of screws 265 and the cylindrical outside surface of the body of the elbow 245 thereby clamped against the edges of a V-notch 266 cut in the upper surface of an arm on the frame 213 in which the elbow 245 is mounted. The bracket for the mirror 244 has a vertical bore into which extends a set screw 267 which bears on a small cylinder 268 located in a semicylindrical groove 269 cut in a flat 270 formed on the turned up end of the elbow 245. The mirror 246 is mounted on its arm 247 in a manner almost identical with the manner in which the mirror 244 is mounted on the elbow 245.

In a balance having the extreme sensitivity of the scale herein described it is necessary to protect the mechanism from shock, prevent the ingress of any dust or particles of material weighed on the scale and to protect it from drafts or currents of air which would deflect the parts.

The scale is mounted on a rigid base 271 by resilient mounting feet 272, one of which is secured to the main frame 1 at each of its outer corners. The feet 272 absorb almost all external vibrations or shocks thus protecting the delicate mechanism. To prevent the ingress of dust, the scale is equipped with a completely closed housing 273 which is shaped to surround the entire weighing and indicating mechanism and which has a window 274 through which the chart 164 is viewed. A secondary housing 275 (Figure II) is formed around the adjustable poise mechanism just described. Because dust, if allowed to accumulate on the load receiving platter 21 or weight platter 23, would throw the balance out an appreciable amount, a pair of dust covers 276 are provided. The covers 276 can be left over the platters 21 and 23 when the scale is not in use and can be placed over the material being weighed and the weights on the weight platter in order to eliminate the errors produced by drafts or air currents striking against either the material being weighed or the counterbalancing weights.

The embodiment of the invention which has been described may be modified to meet various requirements.

Having described the invention, I claim:

1. In a laboratory balance having resilient means engaged near its limits of travel and serving to limit movement of the balance mechanism, in combination, a pivotally mounted indicator, an arcuate chart having a series of indicia for cooperation with said indicator for indicating certain increments of weight, a projection system, an index on said indicator, said index being movable in the projection path of said projection system whereby an image of said index is projected onto said chart to indicate lesser increments of weight than those indicated by said indicator, a pair of pointers mounted on said indicator and movable alternately into said projection system when said resilient means are engaged and a series of indicia on said chart corresponding to each of said pair of pointers for indicating increments of weight counterbalanced by said resilient means.

2. In a laboratory balance, in combination, a substantially even armed lever, a chart having over and under indicia readable in more than one order of increments, automatic counterforce means connected to the lever, an indicator driven by said counterforce means, said counterforce means having a total counterbalancing capacity corresponding to the maximum value of said over and under indicia in one order of increments, said indicator being directly cooperable with said indicia to indicate values counterbalanced by said counterforce means in said order of increments, an index carried by said indicator, a projection system for projecting a shadow of said index onto said chart for cooperation with said indicia to indicate increments of another order, second automatic counterforce means, a disengageable connection between the second counterforce means and the lever that is engaged when the value of the load acting thereon becomes greater than the maximum value counterbalanced by the first said counterforce means, and indicating means on said indicator for said second counterforce means, said indicating means cooperating with indicia on said chart in providing indications of load.

3. In a laboratory balance, in combination, a substantially even armed lever, a chart having over and under indicia readable in more than one order of increments, counterforce means connected to the lever, an indicator driven by said counterforce means, said counterforce means having a total counterbalancing capacity corresponding to the maximum value of said over and under indicia in one order of increments, said indicator being directly cooperable with said indicia to indicate values counterbalanced by said counterforce means in said order of increments, an index carried by said indicator, a projection system for projecting a shadow of said index onto said chart for cooperation with said indicia to indicate increments of another order, a second counterforce means, a disengageable connection between the second counterforce means and the lever that is engaged when the value of the load acting thereon becomes greater than the maximum value counterbalanced by the first said counterforce means, said chart having a series of indicia representing increments of load counterbalanced by said second counterforce means, and a second index carried by said indicator, said projection system being adapted to project a shadow of said second index onto said chart to cooperate with the series of indicia to indicate the values of loads counterbalanced by said second counterforce means.

4. In a laboratory balance, in combination, a substantially even armed lever, a chart having over and under indicia readable in more than one order of increments, counterforce means connected to the lever, an indicator driven by said counterforce means, said counterforce means having a total counterbalancing capacity corresponding to the maximum value of said over and under indicia in one order of increments, said indicator being directly cooperable with said indicia to indicate values counterbalanced by said counterforce means in said order of increments, an index carried by said indicator, a projection system for projecting a shadow of said index onto said chart for cooperation with said indicia to indicate increments of load at greater magnification, a second counterforce means, a disengageable connection between the second counterforce and a point of the lever closely adjacent the point of connection between said lever and the first said counterforce means, said disengageable connection being engaged when the value of the load acting on the lever becomes greater than the maximum value counterbalanced by the first said counterforce means and indicating means for said second counterforce means.

5. In a laboratory balance, in combination, a substantially even armed lever, a chart having over and under indicia readable in more than one order of increments, counterforce means connected to the lever, an indicator driven by said counterforce means, said counterforce means having a total counterbalancing capacity corresponding to the maximum value of said over and under indicia in one order of increments, said indicator being directly cooperable with said indicia to indicate values counterbalanced by said counterforce means in said order of increments, an index carried by said indicator, a projection system for projecting a shadow of said index onto said chart for cooperation with said indicia to indicate increments of another order, a second counterforce means, a disengageable connection between the second counterforce and a point on the lever closely adjacent the point of connection between said lever and the first said counterforce means, said connection being engaged when the value of the load acting on the lever becomes greater than the maximum value counterbalanced by the first said counterforce means over and under indicia on said chart in the order of increments counterbalanced by said second counterforce means and a pair of pointers carried by said indicator and alternately positionable in the projection path of said projection system for projection of a shadow of one of said pointers onto said chart for cooperation with said last mentioned indicia to indicate the increments counterbalanced by said second counterforce means.

6. In a laboratory balance, in combination, a substantially even armed lever, a load receiver supported on one arm of said lever, a chart, a weight receiver supported on the other arm of said lever, an indicator cooperating with the chart, counterforce means connecting said indicator to said lever, said counterforce means being capable of counterbalancing a certain moment created by out-of-balance condition between the arms of said lever, degree of out-of-balance indicia on said chart for direct cooperation with said indicator to indicate the value of the moment counterbalanced by said counterforce means, a variably positionable weight supported by and movable along said lever to change the degree of out-of-balance between the arms of said lever and projection means for projecting an indication of such change of out-of-balance condition onto said chart.

7. In a laboratory balance, in combination, a substantially even armed lever, a load receiver supported on one arm of said lever, a weight receiver supported on the other arm of said lever, a chart, an indicator cooperating with the chart, a counterforce means connecting said indicator to said lever, said counterforce means being capable of counterbalancing a certain moment created by out-of-balance condition between the arms of said lever, degree of out-of-balance indicia on said chart for direct cooperation with said indicator to indicate the value of the moment counterbalanced by said counterforce means, a weight supported on said lever and movable along the arm of said lever supporting said weight receiver, manually operable means for moving said weight, a transparent fine indicia bearing member movable by said manually operable means in proportion to the movement of said weight, a projection system for projecting the indicia on said member onto said chart, an index lying in and movable across the projection path of said projection system, and a series of coarse indicia on said chart for cooperation with the shadow of said index projected by said projection system.

LAWRENCE S. WILLIAMS.

REFERENCES CITED

The following references are of record in the file of this patent:

UNITED STATES PATENTS

| Number | Name | Date |
|---|---|---|
| 842,688 | Nilson | Jan. 29, 1907 |
| 1,703,406 | Schaper | Feb. 26, 1929 |
| 1,856,704 | Hadley | May 3, 1932 |
| 2,300,282 | Eash | Oct. 27, 1942 |
| 2,302,402 | Sullivan | Nov. 17, 1942 |
| 2,355,437 | Weckerly | Aug. 8, 1944 |
| 2,388,912 | Haferl et al. | Nov. 13, 1945 |